US010039161B2

(12) United States Patent
Boulanger et al.

(10) Patent No.: US 10,039,161 B2
(45) Date of Patent: Jul. 31, 2018

(54) LIGHTING ARRANGEMENT WITH BATTERY BACKUP

(71) Applicant: CP IP Holdings Limited, Central Hong Kong (CN)

(72) Inventors: Dave Boulanger, Hong Kong (CN); Maciej Nowakowski, West Vancouver, CA (US)

(*) Notice: Subject to any disclaimer, the term of this patent is extended or adjusted under 35 U.S.C. 154(b) by 0 days.

(21) Appl. No.: 15/248,665

(22) Filed: Aug. 26, 2016

(65) Prior Publication Data

US 2016/0366738 A1 Dec. 15, 2016

Related U.S. Application Data

(63) Continuation-in-part of application No. 14/956,416, filed on Dec. 2, 2015, and a continuation-in-part of application No. 14/986,760, filed on Jan. 4, 2016.

(Continued)

(51) Int. Cl.

| | |
|---|---|
| ***B60Q 1/00*** | (2006.01) |
| ***H05B 33/08*** | (2006.01) |
| ***F21V 17/00*** | (2006.01) |
| ***F21V 17/14*** | (2006.01) |
| ***F21S 9/02*** | (2006.01) |
| *F21S 8/02* | (2006.01) |
| *F21V 21/02* | (2006.01) |

(Continued)

(52) U.S. Cl.

CPC ............ *H05B 33/0815* (2013.01); *F21S 9/02* (2013.01); *F21V 17/005* (2013.01); *F21V 17/14* (2013.01); *F21S 8/024* (2013.01); *F21S 8/026* (2013.01); *F21V 21/02* (2013.01); *F21V 21/04* (2013.01); *F21Y 2105/18* (2016.08); *F21Y 2115/10* (2016.08)

(58) Field of Classification Search

USPC .................... 362/368, 370, 249.02, 183, 800

See application file for complete search history.

(56) References Cited

U.S. PATENT DOCUMENTS

| | | | |
|---|---|---|---|
| 6,082,871 | A | 7/2000 | Yeh |
| 7,273,983 | B1 | 9/2007 | Rintz |

(Continued)

FOREIGN PATENT DOCUMENTS

| | | | |
|---|---|---|---|
| CA | 2586494 | A1 | 10/2007 |
| CA | 2754514 | A1 | 4/2012 |

(Continued)

OTHER PUBLICATIONS

European Search Report for application No. 16150077.2, May 23, 2016, 10 pgs.

(Continued)

*Primary Examiner* — Vip Patel

(57) ABSTRACT

A lighting arrangement can include a light emitter portion and a battery backup portion. The light emitter portion can have a plurality of light emitting diodes and circuitry for driving the plurality of light emitting diodes including a rectifier and an IC chip configured to drive the plurality of light emitting diodes with the rectified voltage provided by the rectifier. The battery backup portion can be in electronic communication with the light emitter portion and can have a battery portion with one or more batteries and a converter portion with a DC-AC inverter downstream of the one or more batteries that directs the electrical power to the rectifier and is driven by the one or batteries.

23 Claims, 17 Drawing Sheets

Related U.S. Application Data

(60) Provisional application No. 62/210,464, filed on Aug. 27, 2015, provisional application No. 62/086,820, filed on Dec. 3, 2014, provisional application No. 62/099,492, filed on Jan. 3, 2015.

(51) Int. Cl.

| | |
|---|---|
| *F21V 21/04* | (2006.01) |
| *F21Y 115/10* | (2016.01) |
| *F21Y 105/18* | (2016.01) |

(56) References Cited

U.S. PATENT DOCUMENTS

| | | | |
|---|---|---|---|
| 8,333,491 | B1 | 12/2012 | Chou et al. |
| 8,376,777 | B2 | 2/2013 | Smith |
| 2008/0278958 | A1 | 11/2008 | Jiang |
| 2009/0203260 | A1 | 8/2009 | Vogt et al. |
| 2009/0213595 | A1 | 8/2009 | Alexander et al. |
| 2010/0091484 | A1 | 4/2010 | Mayfield et al. |
| 2012/0187852 | A1 | 7/2012 | Mandy et al. |
| 2012/0261992 | A1 | 10/2012 | Parker et al. |
| 2012/0268894 | A1 | 10/2012 | Alexander et al. |
| 2013/0033872 | A1 | 2/2013 | Randolph et al. |
| 2013/0153731 | A1 | 6/2013 | Engstrom et al. |
| 2013/0342342 | A1 | 12/2013 | Sabre et al. |
| 2014/0071687 | A1 | 3/2014 | Tickner et al. |
| 2014/0092606 | A1 | 4/2014 | Potucek et al. |
| 2014/0092608 | A1 | 4/2014 | Moser et al. |
| 2014/0268768 | A1 | 9/2014 | Holland et al. |
| 2016/0230973 | A1 | 8/2016 | Shaw |

FOREIGN PATENT DOCUMENTS

| | | | |
|---|---|---|---|
| CA | 2766601 | A1 | 6/2013 |
| DE | 4030077 | A1 | 3/1992 |
| GB | 2500797 | A | 10/2013 |
| JP | 2010287459 | A | 12/2010 |
| KR | 100985710 | B1 | 10/2010 |
| WO | 2013175233 | A2 | 11/2013 |

OTHER PUBLICATIONS

Extended European Search Report for Application No. 16275119.2 dated Feb. 13, 2017.

Communication Issued by European Patent Office in Application 15197462.3-1757; dated Apr. 6, 2016.

LIGHTING ARRANGEMENT WITH BATTERY BACKUP

CROSS-REFERENCE TO RELATED APPLICATIONS

This application is a continuation-in-part of pending U.S. patent application Ser. No. 14/956,416 for a LIGHTING ARRANGEMENT, filed on 2 Dec. 2015, which is hereby incorporated by reference in its entirety. This application also claims the benefit of U.S. Provisional Patent Application Ser. No. 62/210,464 for a LIGHTING ARRANGEMENT, filed on 27 Aug. 2015, which is hereby incorporated by reference in its entirety. This application is also a continuation-in-part of pending U.S. patent application Ser. No. 14/986,760 for a LIGHTING ARRANGEMENT, filed on 4 Jan. 2016, which is hereby incorporated by reference in its entirety.

BACKGROUND

1. Field

The present disclosure relates to structures operable to emit light.

2. Description of Related Prior Art

U.S. Pat. No. 8,376,777 discloses a QUICK MOUNTING DEVICE WITH MODULES. The quick mounting device for appliances is alleged to be quickly and easily engaged and disengaged mechanically without the use of tools.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A lighting arrangement can include a light emitter portion and a battery backup portion. The light emitter portion can have a plurality of light emitting diodes and circuitry for driving the plurality of light emitting diodes including a rectifier and an IC chip configured to drive said plurality of light emitting diodes with the rectified voltage provided by rectifier. The battery backup portion can be in electronic communication with the light emitter portion and can have a battery portion with one or more batteries and a converter portion with a DC-AC inverter downstream of the one or more batteries that directs the electrical power to the rectifier and is driven by the one or batteries.

BRIEF DESCRIPTION OF THE DRAWINGS

The detailed description set forth below references the following drawings.

DETAILED DESCRIPTION

Figure 1:
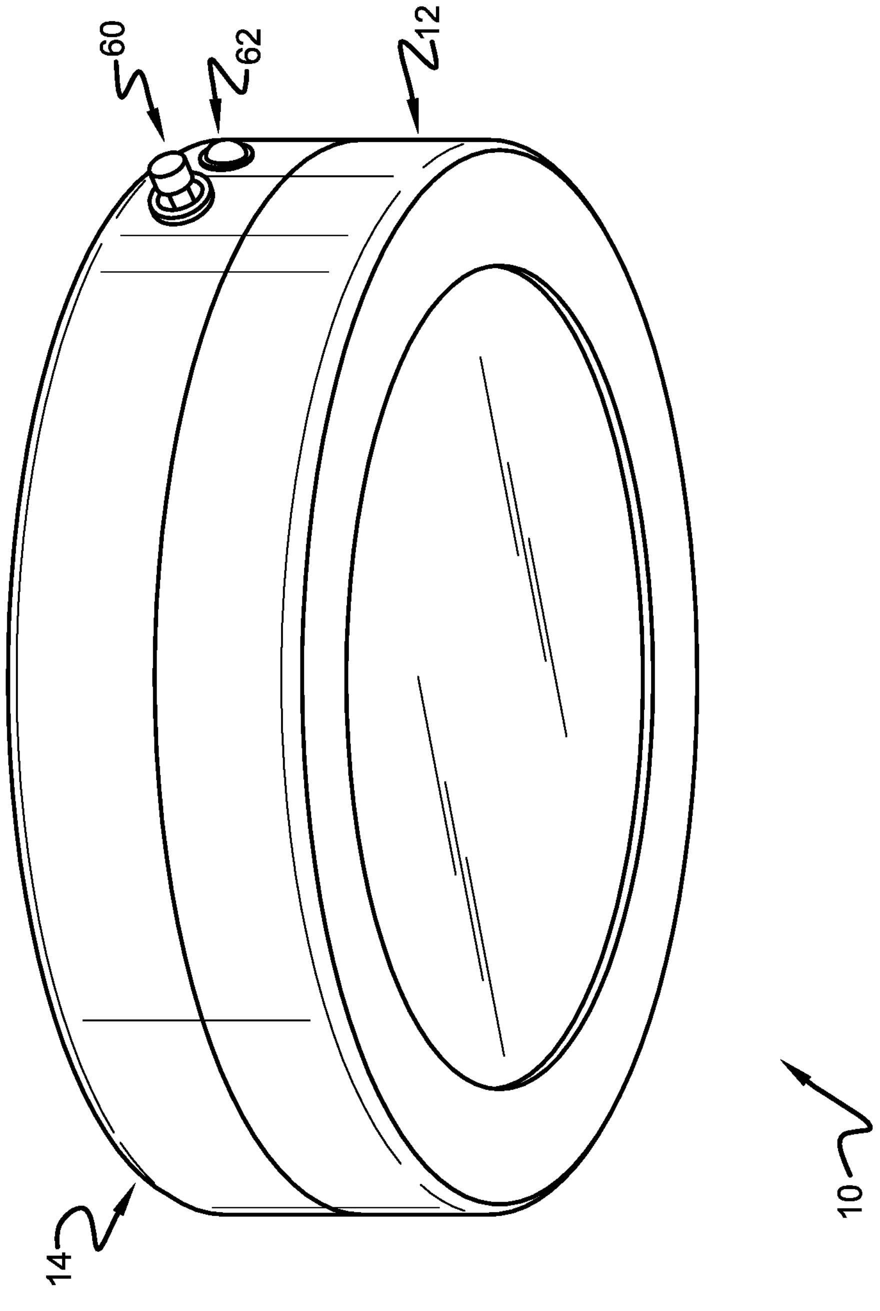
FIG. 1 a perspective view of a lighting arrangement having a battery backup for operation according to an exemplary embodiment of the present disclosure.

The present disclosure, as demonstrated by the exemplary embodiments described below, can provide at least a pair of benefits over prior art devices, such as by way of example and not limitation a smaller driver and battery size along with the number of light emitting diodes (LEDs) being variable based on the battery voltage. In the prior art of LED lighting, the approach is a DC-DC converter since LEDs are typically DC devices and not that described herein.

A plurality of different embodiments of the present disclosure is shown in the Figures of the application. Similar features are shown in the various embodiments of the present disclosure. Similar features across different embodiments have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

Figure 2:
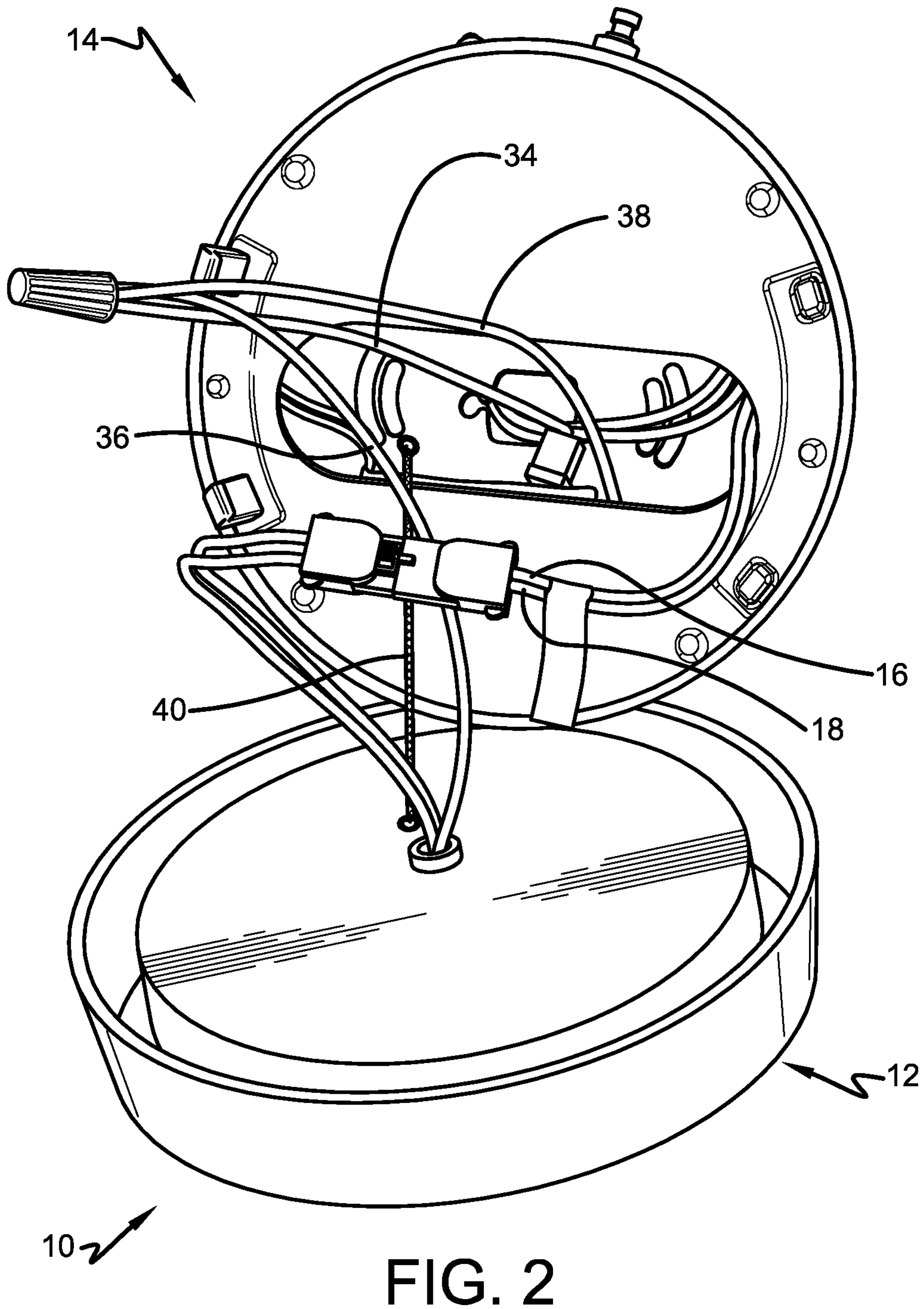
FIG. 2 is a perspective view of the lighting arrangement shown in FIG. 1 with a light emitter portion partially unattached from a battery backup portion.
Figure 3:
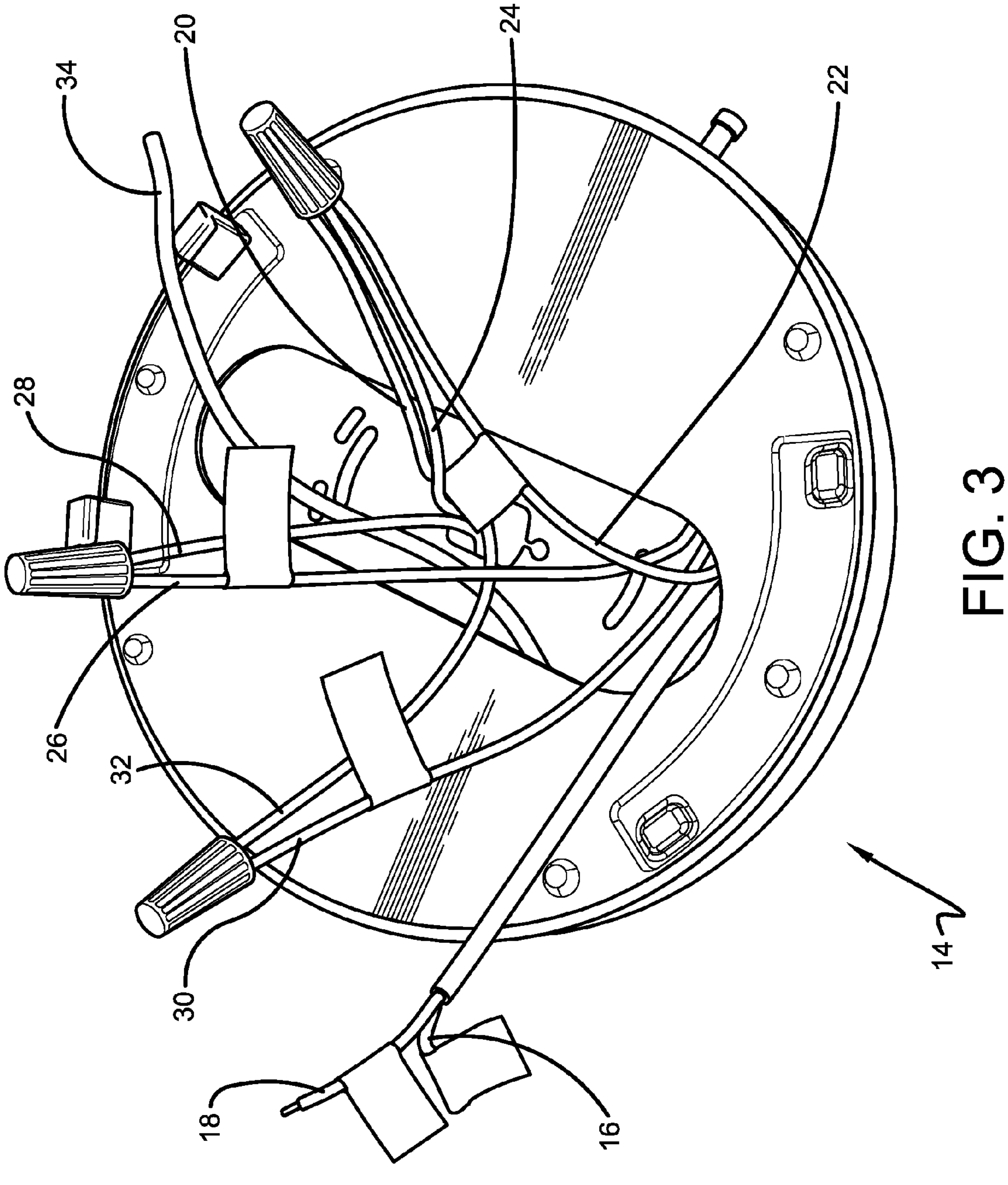
FIG. 3 is a perspective view of the battery backup portion of the lighting arrangement shown in FIGS. 1 and 2.
Figure 4:
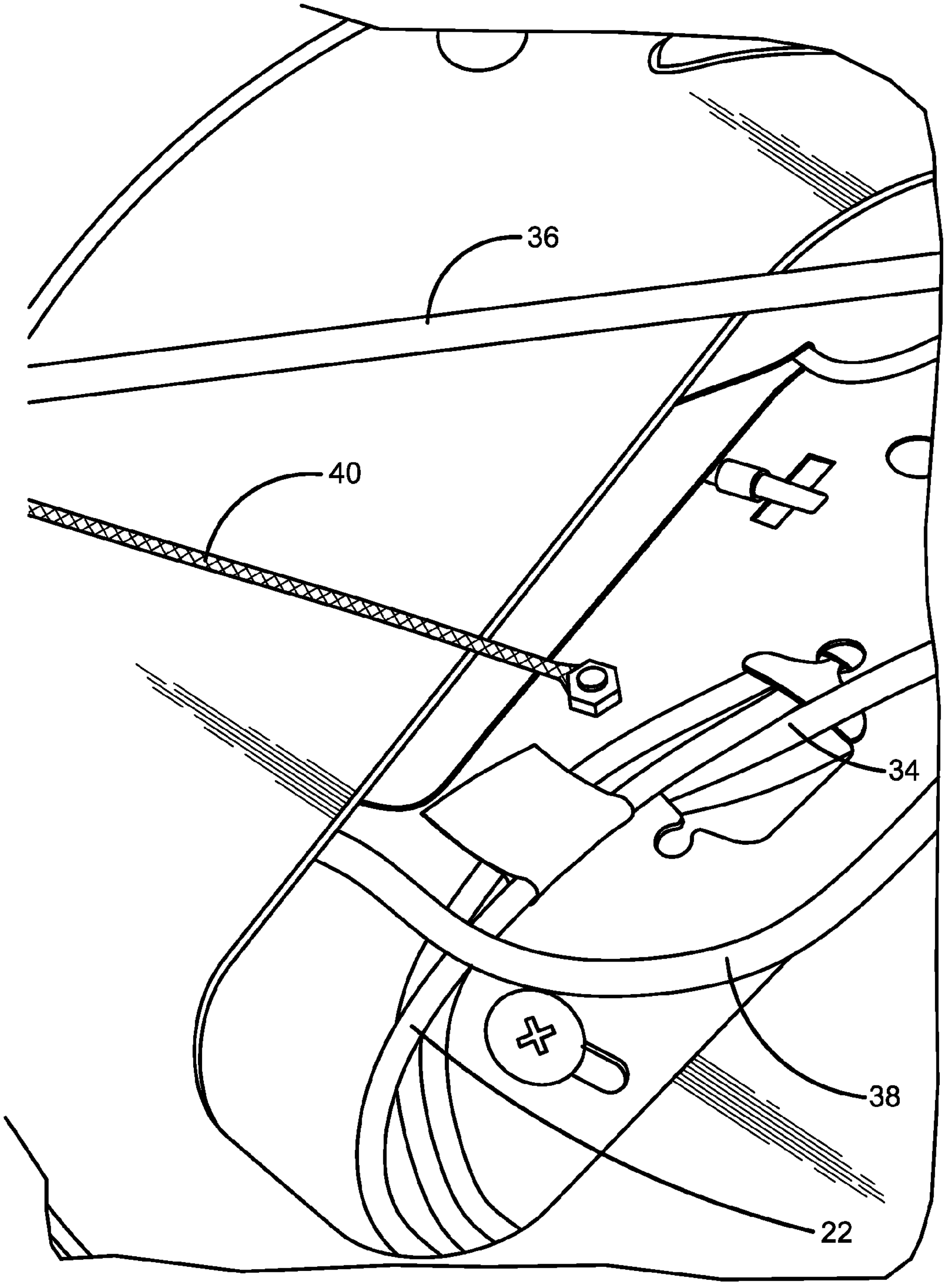
FIG. 4 is a magnified view of the structures shown in FIG. 3.

FIG. 1 is a perspective view of an exemplary lighting arrangement 10 according to the present disclosure. FIG. 2 is a perspective view of the lighting arrangement 10 shown in FIG. 1 with a light emitter portion 12 partially attached to a battery backup portion 14. FIG. 3 is a perspective view of the battery backup portion 14 of the lighting arrangement shown in FIGS. 1 and 2. FIG. 4 is a magnified view of the battery backup portion 14. The circuit schematic shown in FIG. 5 is applied in the embodiment.

In FIG. 3, leads 16, 18 can extend to an LED array of the light emitter portion 12 from the battery backup portion 14. Leads 20, 22, and 24 can define a neutral connection. Leads 26, 28, can define a continuous, un-switched connection to the LED array of the light emitter portion 12 through the lead 18. AC from a standard or regular or non-emergency source can be supplied to the LED array of the light emitter portion 12 through leads 18, 26, 28. Leads 30, 32, can define a switched connection to the LED array of the light emitter portion 12 through the lead 18. AC from a battery of the battery backup portion 14 can be supplied to the LED array of the light emitter portion 12 through leads 18, 30, 32 when the standard or regular or non-emergency source has failed. Lead 34 can define a ground connection. A ground 36 from the LED array of the light emitter portion 12 and a ground 38 from the standard or regular or non-emergency source can be spliced to the ground lead 34.

The battery backup portion 14 can allow the light emitter portion 12 to function as it would function under the standard or regular or non-emergency source. The light emitter portion 12 can be fully functional, including dimmable. The battery backup portion 14 can be mounted directly to a junction box. When the leads have been connected, the leads can be arranged inside the battery backup portion 14. The battery backup portion 14 can be connected to the light emitter portion 12 through a safety wire 40. The safety wire 40 can ease installation and prevent completion separation of the light emitter portion 12 from the battery backup portion 14. The battery backup portion 14 can also include a test circuit with a push test button, referenced at 60 in FIG. 1. The LED 62 and the test button 60 are mounted in the battery backup portion 14. When the button 60 is pressed, an LED 62 will be powered by the battery backup portion 14 if the battery backup portion 14 has power.

Figure 5:
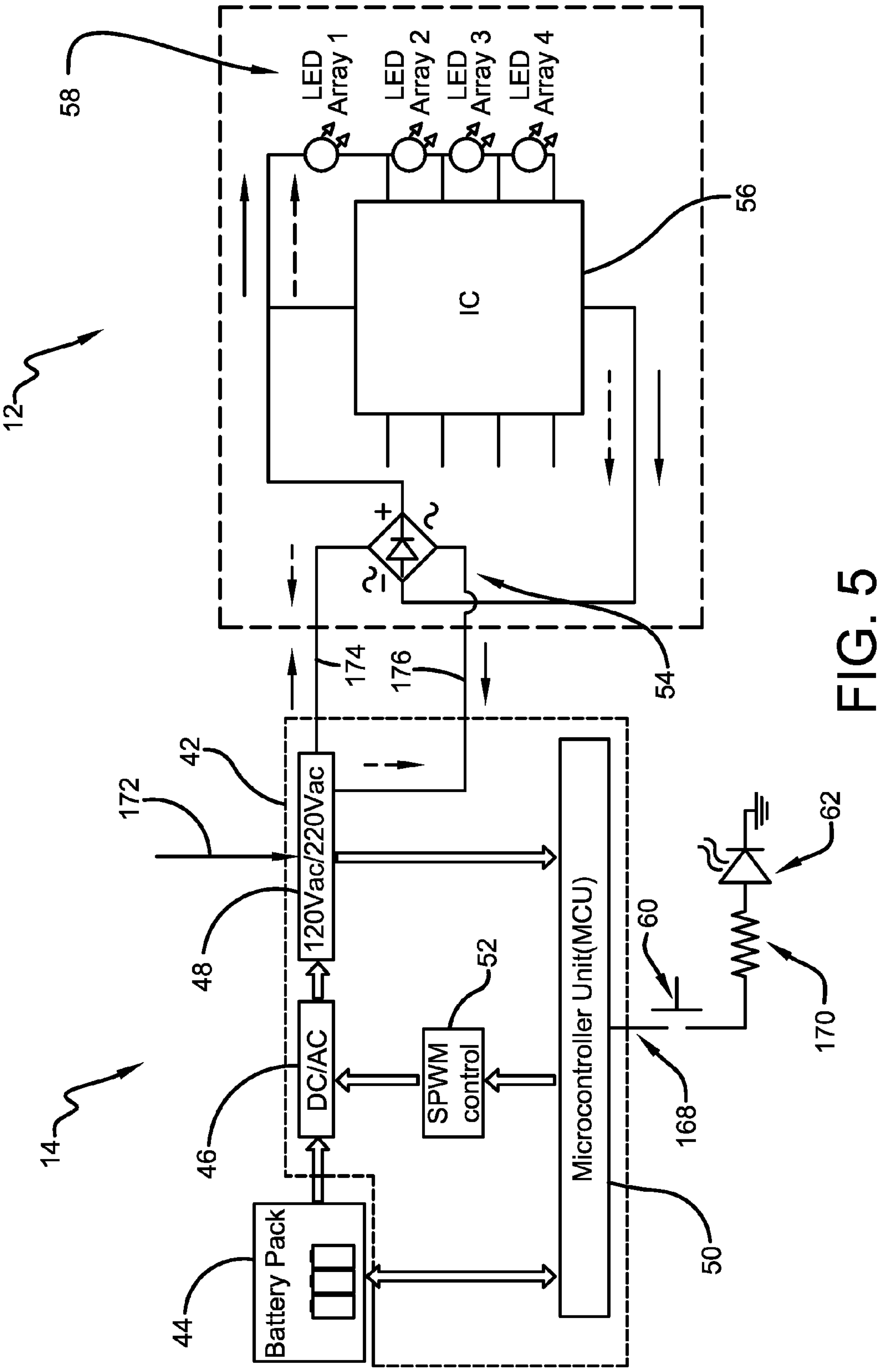
FIG. 5 is a circuit schematic of the circuit incorporated in the lighting arrangement shown in FIGS. 1-4.

FIG. 5 is a circuit schematic according to an exemplary embodiment of the present disclosure. The exemplary embodiment shown in FIG. 5 provides a driver circuit for the light emitter portion 12 shown in FIGS. 1-4. A prior art driver circuit is a relatively large structure, but the exemplary embodiment can provide a chip mounted on the light emitter portion 12. The chip can tightly control voltage fluctuations. As a result, a battery for powering the light emitter portion 12 during an outage can be smaller in terms of physical size or power rating than would otherwise be required.

The battery backup portion 14 can include converter portion 42 and a battery portion 44. The converter portion 42 can be operably disposed between the battery portion 44 and the light emitter portion 12. The converter portion 42 can itself be powered by the battery portion 44. The battery portion 44 can have any desired physical size. The battery portion 44 can be defined by a single battery or an array of batteries connected in series or in parallel. By way of example and not limitation, the battery portion 44 can include one or more Samsung® Model ICR18650-26F batteries, each having a length of sixty-five millimeters and a diameter of eighteen and four-tenths millimeters. This yields a volume of seventeen-thousand two-hundred and eighty-four cubic millimeters. The battery portion 44 can be rated at 3.8 volts, 2600 mAh and have a capacity is 9.88 Wh after being charged. In one embodiment of the present disclosure, three batteries can be connected in series having a volume of fifty-one-thousand eight-hundred and fifty-one cubic millimeters.

The converter portion 42 can include a DC-AC converter 46. The DC-AC converter 46 can be a functional group that includes a plurality of components such as a transistor, diode, capacitor, and transformer. The DC-AC converter 46 can convert relatively low DC voltage from the battery portion 44 into AC voltage. The box 48 simply refers to the output of the converter portion 42.

The converter portion 42 can also include a microcontroller unit 50. The microcontroller unit 50 can include voltage dividers, amplifiers, RAM, a timer, A/D, PWM, and other integrated functions. In one or more embodiments of the present disclosure, the microcontroller unit 50 can include an enhanced 8051 series MCU, such as a SH79F081A provided by Sino Wealth, alongside voltage dividers and amplifiers that enable the high voltages and currents to be measured by the A/D.

The converter portion 42 can also include a sinusoidal pulse-width modulation (SPWM) module 52. The SPWM module 52 can be integral with the microcontroller unit 50. The SPWM module 52 can generate a sinusoidal modulated pulse in response to a control signal emitted by the microcontroller unit 50 to SPWM module 52. The pulse can be utilized to control the ON/OFF status of a transistor of the converter 46, such as a MOSFET. When the transistor is open, the converter portion 42 can be engaged to communicate AC power to a rectifier 54. The microcontroller unit 90 can be arranged to monitor the delivery of AC power to the light emitter portion 12 from a primary source of power, such as the grid. When the primary or main electrical power is off due to an emergency, or power outage, or some other condition, the microcontroller unit 50 can emit the pulse to engage the other portions of the converter portion 42 and supply power to the light emitter portion 12.

The battery portion 44 and converter portion 42 can define an emergency back-up to the light emitter portion 12. The battery portion 44 and converter portion 42 can be formed as an integral battery backup portion 14 that can be attached to the junction box delivering electrical power to the light emitter portion 12. Wire nuts can connect the three (3) wires available for connection into junction box.

In one or more exemplary embodiments, the battery portion 44 can provide thirty watt-hours of power. When supporting a twenty watt light emitter portion 12 (or fixture), the battery portion 44 can thus provide power for one and a half hours. The power can be provided almost instantaneously; when power is lost from the standard or regular or non-emergency source, the micro-controller 50 can engage the inverter circuit 46 to supply 120V, AC power to the light emitter portion 12.

The output signal of the converter portion 42 is directed through the bridge rectifier 54. The signal can be received by an IC chip 56. The light emitter portion 12 can control individual LEDs of an LED array string 58 based on the input voltage. The quantity of LEDs can be variable. Unlike a traditional arrangement, the light emitter portion 12 can be configured to drive the IC chip 56 directly in relatively high voltage rectified AC mode and not to transform relatively high voltage rectified AC to low voltage DC. IC chip 56 is configured to provide device appropriate current flow into the LED array string 58. Many different step-IC chips can be utilized in various embodiments of the present disclosure, depending on different functions that may be desired, such as dimming or particular color dimming for differently colored LEDs. One example of a step-IC that can be utilized in one or more embodiments of the present disclosure for the IC chip 56 is a MAP9001 supplied by MagnaChip Semiconductor. The MAP9001 has the ability to accept voltages between 90V and 270V rectified voltage.

A connection to the grid is referenced at 172. AC from the rectifier 54 can pass to the rectifier 54 from the box 48 along line 174. AC from the rectifier 54 can return to the box 48 along line 176 (neutral). The power flow is illustrated with solid and dashed arrows. Because the AC is rectified there are two half cycles. In the positive half cycle (solid arrows), the power flows from line 174, through the rectifier 54, and out of the terminal marked (+), around to the LED string 58, through the chip 56, back through the rectifier 54, and then to neutral 176. During the negative half cycle (dashed arrows), the power flows from neutral 174, through the rectifier 54, out of the terminal marked (+), through the LED string 58, through the chip 56, back through the rectifier 54, and then through the line 174.

The arrangement described above results in the unexpected benefit of a smaller backup battery along with the number of light emitting diodes (LEDs) being variable based on the battery voltage.

FIG. 5 illustrates one approach to connecting the button 60 and LED 62 to the circuit. The microcontroller 50 can be measuring/monitoring the voltage of the battery portion 44. The microcontroller 50 can include an output referenced at 168 that is connected to the LED 62 through the switch 60 and a resistor 170. The microcontroller 50 can be configured to turn on the output 168 when the battery portion 44 is charged; thus, when the user presses the button 60, the LED 62 would illuminate. If the battery portion 44 were not charged, the output 168 would be off and pressing the button 60 not cause the LED 62 to illuminate.

In the first exemplary embodiment, the battery backup portion 14 and the light emitter portion 12 are fixed directly together. Also, the exemplary light emitter portion 12 and the exemplary battery backup portion 14 have substantially the same outer profile, as shown in FIG. 1. The exemplary light emitter portion 12 and the exemplary battery backup portion 14 can thus both be exposed after installation without aesthetic concerns. The exemplary light emitter portion 12 and the exemplary battery backup portion 14 can be mounted on a ceiling or on a wall, both visible.

Figure 6:
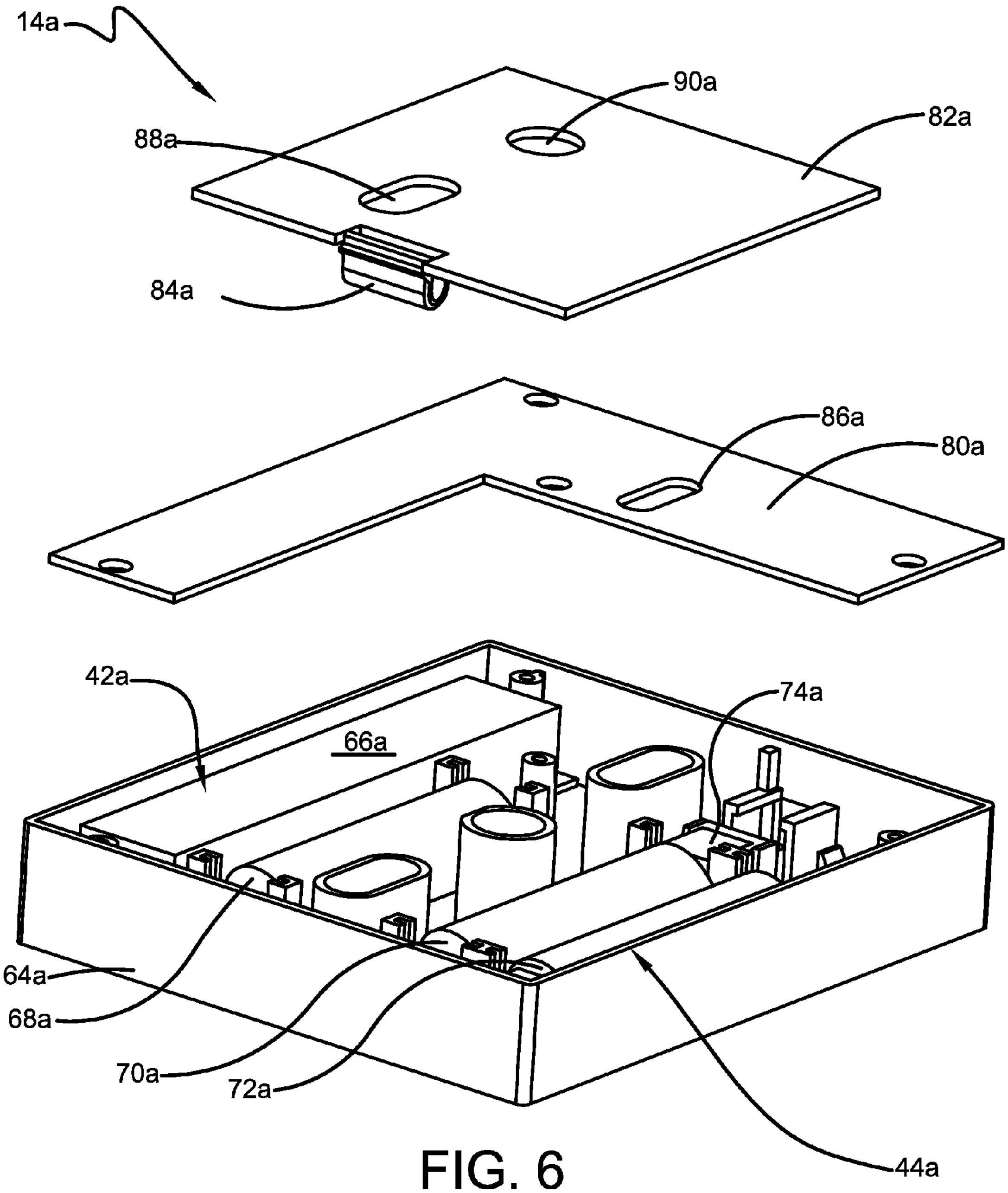
FIG. 6 is an exploded view of a second exemplary battery backup according to one or more implementations of the present disclosure.
Figure 7:
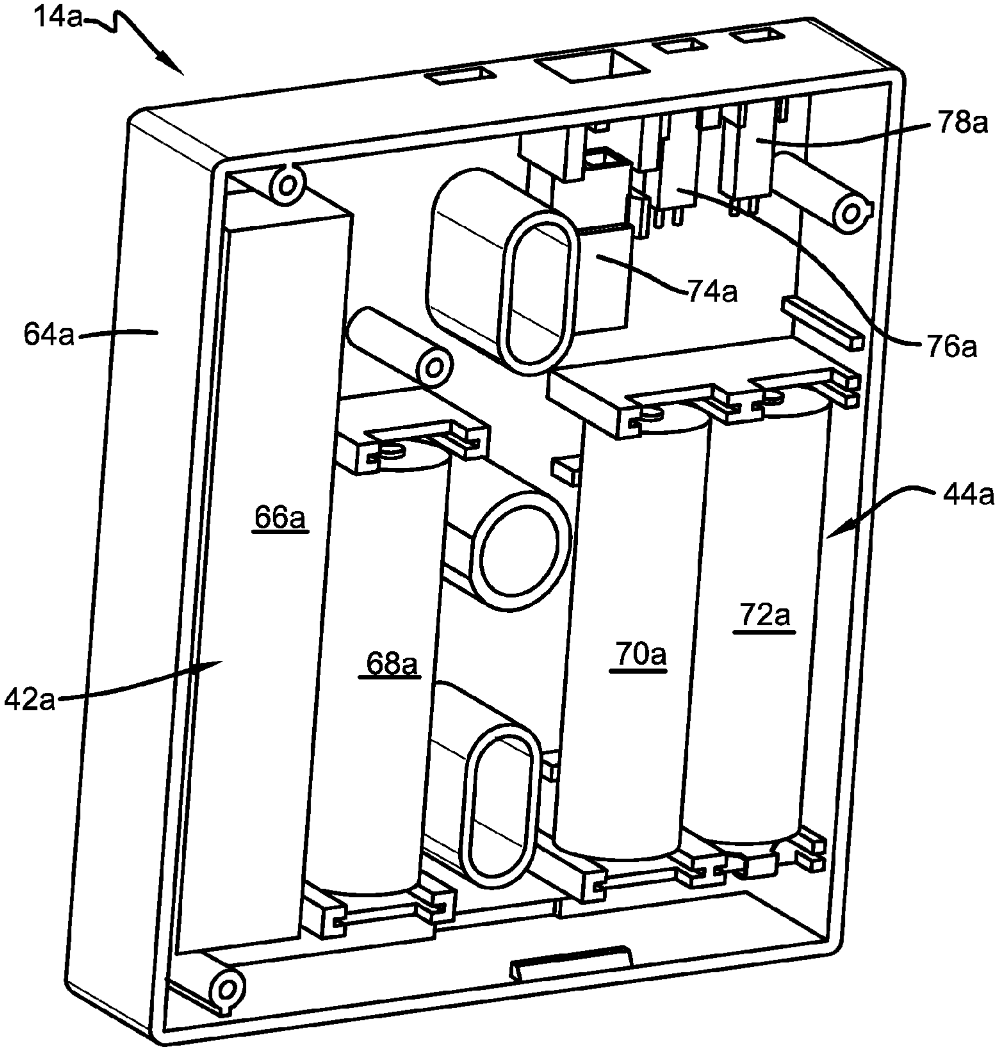
FIG. 7 is a rear perspective view of the second exemplary battery backup shown in FIG. 6 with covers removed to show internal structures.
Figure 8:
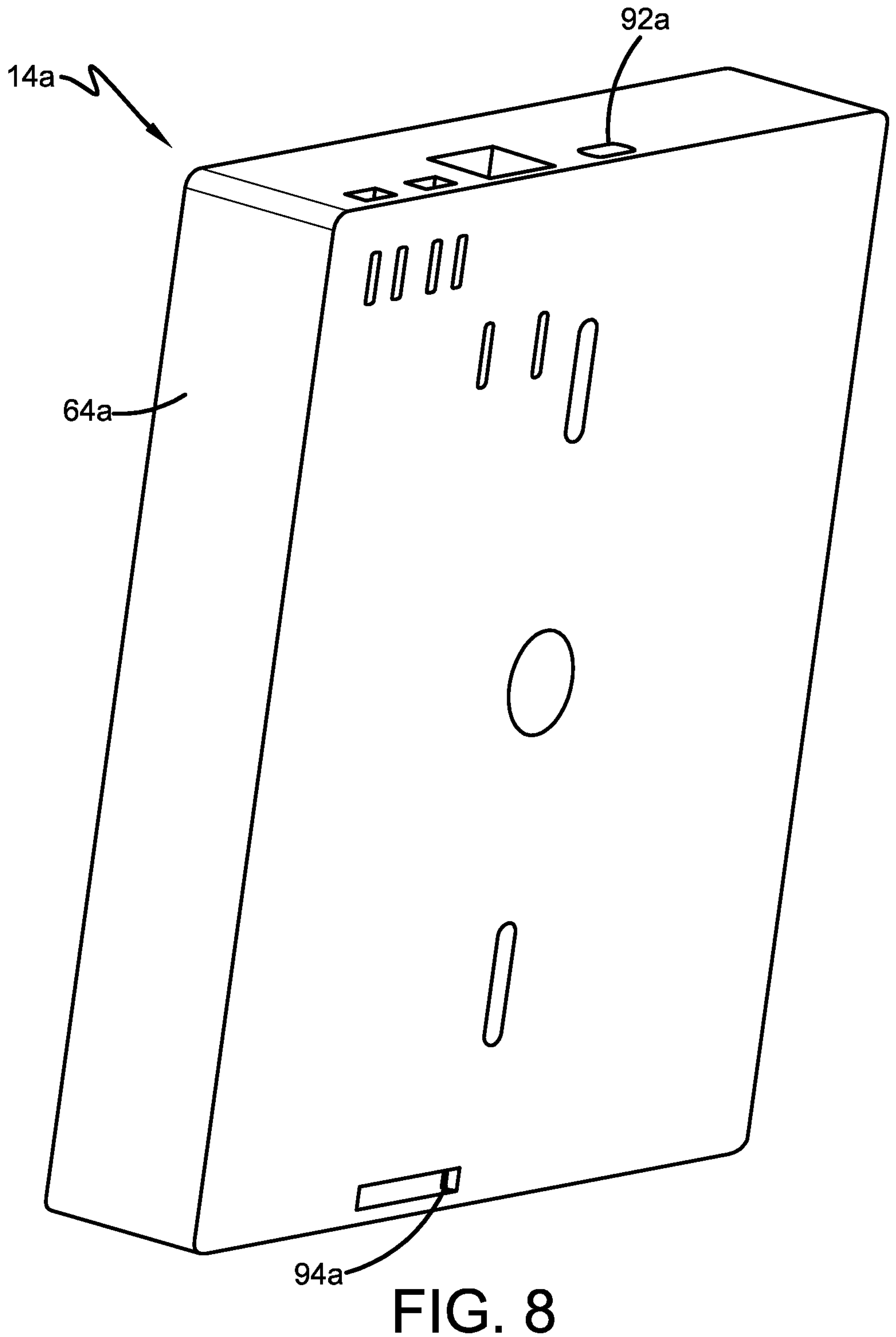
FIG. 8 is a front perspective view of the second exemplary battery backup shown in FIG. 6.
Figure 9:
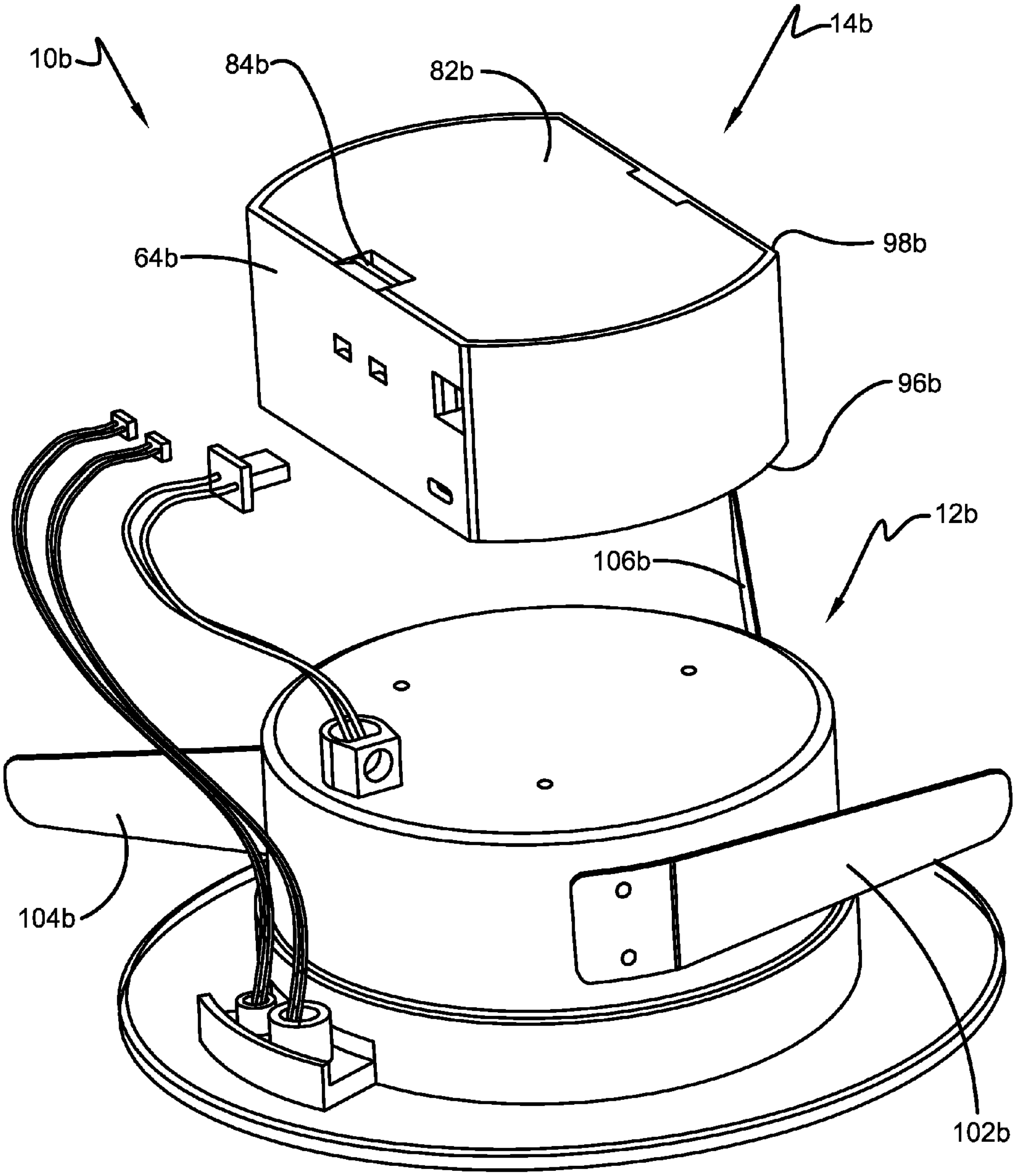
FIG. 9 is an exploded view of a third exemplary lighting arrangement according to one or more implementations of the present disclosure.

The first exemplary battery backup portion 14 is circular. FIGS. 6-8 are of a second exemplary battery backup portion 14*a*. The second exemplary battery backup portion 14*a* is square and can be exposed after installation without aesthetic concerns and mounted directly to a light emitter, similar to the first exemplary battery backup portion 14. The second exemplary battery backup portion 14*a* can be utilized with a wall sconce. The second exemplary battery backup portion 14*a* can include a case 64*a*. A converter portion 42*a* and a battery portion 44*a* can be positioned in the case 64*a*. The exemplary converter portion 42*a* is shown as a subcase 66*a*; the circuitry of the converter portion 42*a* is disposed within the subcase 66*a*. The schematic of FIG. 5 is applicable to the lighting arrangement 10*a*.

The exemplary battery portion 44*a* includes batteries 68*a*, 70*a*, 72*a*. The second exemplary battery backup portion 14*a* can also include a plug 74*a* for interconnecting electronically with a light emitter portion (not shown), a plug 76*a* for interconnecting electronically with a test LED such as LED 62 (not shown), and a plug 78*a* for interconnecting electronically with a test button such as test button 60 (not shown). Apertures are defined in the exemplary case 64*a* for receiving mating plugs. It is noted that wiring among the various components is not shown to enhance the clarity of the other structures, but the batteries 68*a*, 70*a*, 72*a*, the converter portion 42*a*, and the plugs 74*a*, 76*a*, 78*a* are electronically connected with one another through wiring.

The second exemplary battery backup portion 14*a* can also include a cover 80*a* to enclose the converter portion 42*a* and the plugs 74*a*, 76*a*, 78*a* in the case 64*a*. The second exemplary battery backup portion 14*a* can also include a door 82*a*. The door 82*a* can be selectively opened and closed with a clip 84*a*. When the door 82*a* is closed, the batteries 68*a*, 70*a*, 72*a* are enclosed in the case 64*a*. The cover 80*a* and door 82*a* can include one or more apertures such as apertures 86*a*, 88*a*, 90*a* for receiving mounting hardware projecting from a wall. The case 64*a* can include apertures such as apertures 92*a*, 94*a* for receiving tabs associated with a light emitter to hang the light emitter on the case 64*a*.

FIGS. 9-12 are of an embodiment of the present disclosure that is a recessed lighting arrangement 10*b*. The lighting arrangement 10*b* includes a light emitter portion 12*b* having a plurality of light emitting diodes and circuitry for driving the plurality of light emitting diodes including a rectifier and an IC chip downstream of the rectifier. The lighting arrangement 10*b* also includes a battery backup portion 14*b* in electronic communication with the light emitter portion 12*b* and having a battery portion with one or more batteries and a converter portion with a DC-AC inverter downstream of the one or more batteries that directs the electrical signal to the rectifier and is driven by the one or batteries. The schematic of FIG. 5 is applicable to the lighting arrangement 10*b*.

Figure 11:
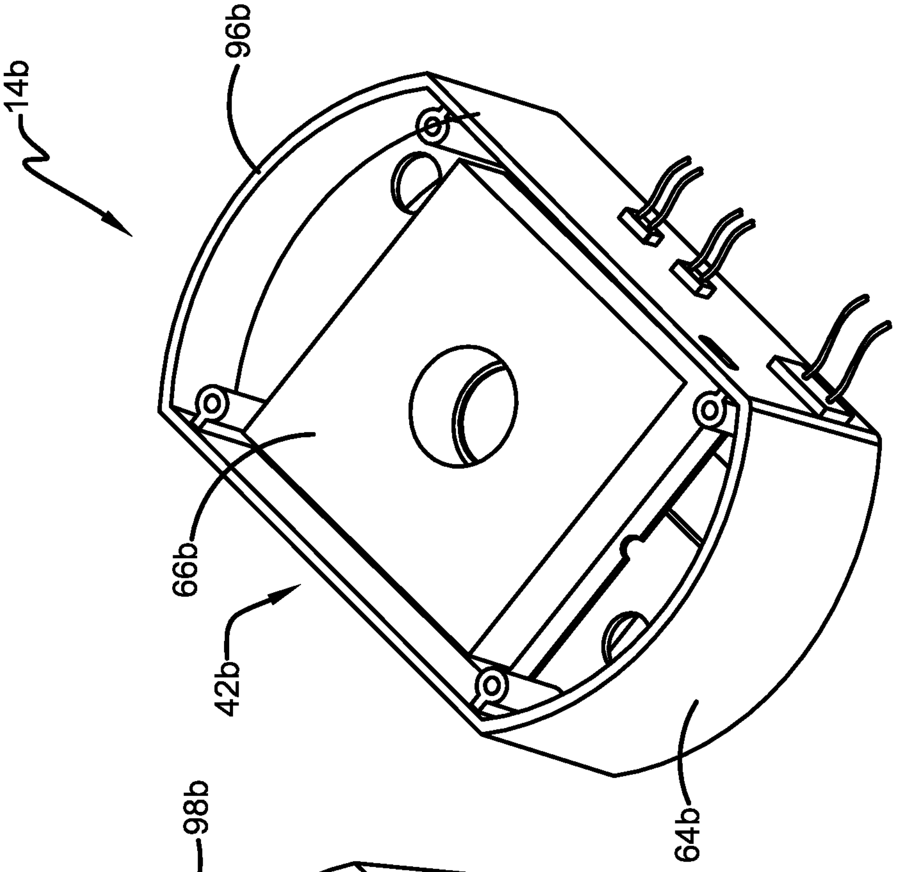
FIG. 11 is a perspective view from a bottom perspective looking upward of a battery backup of the third exemplary lighting arrangement.
Figure 10:
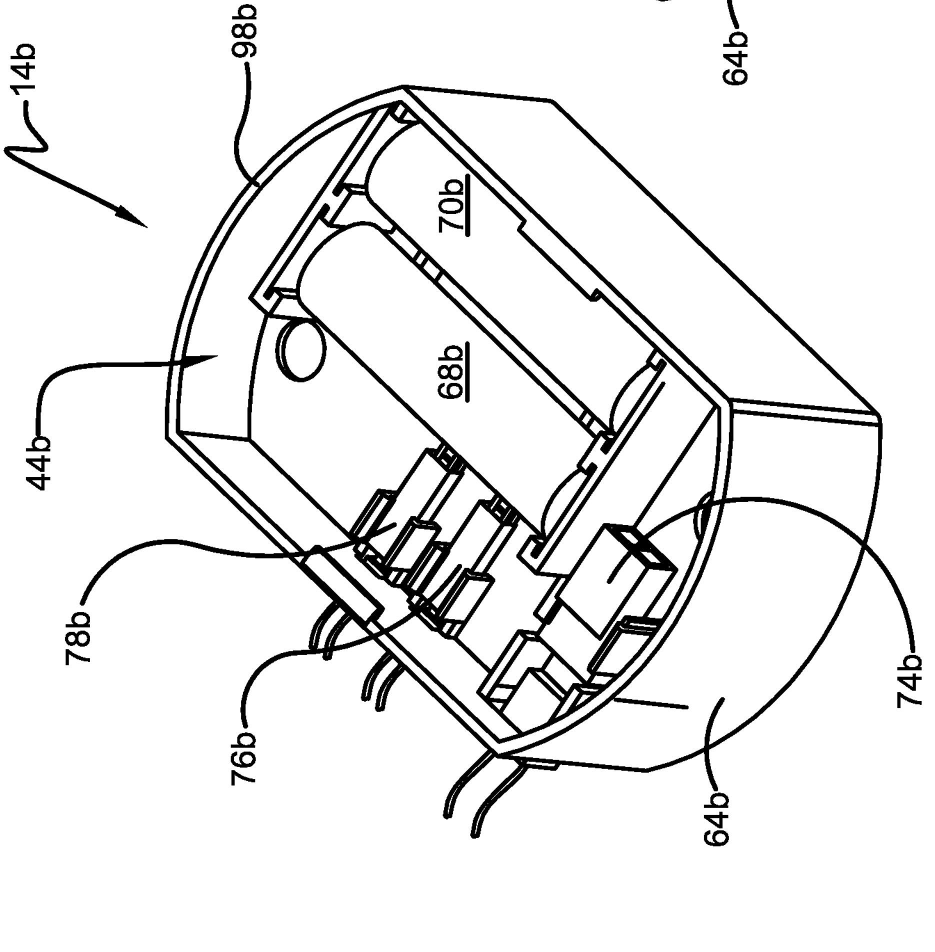
FIG. 10 is a perspective view from a top perspective looking downward of a battery backup of the third exemplary lighting arrangement.
Figure 12:
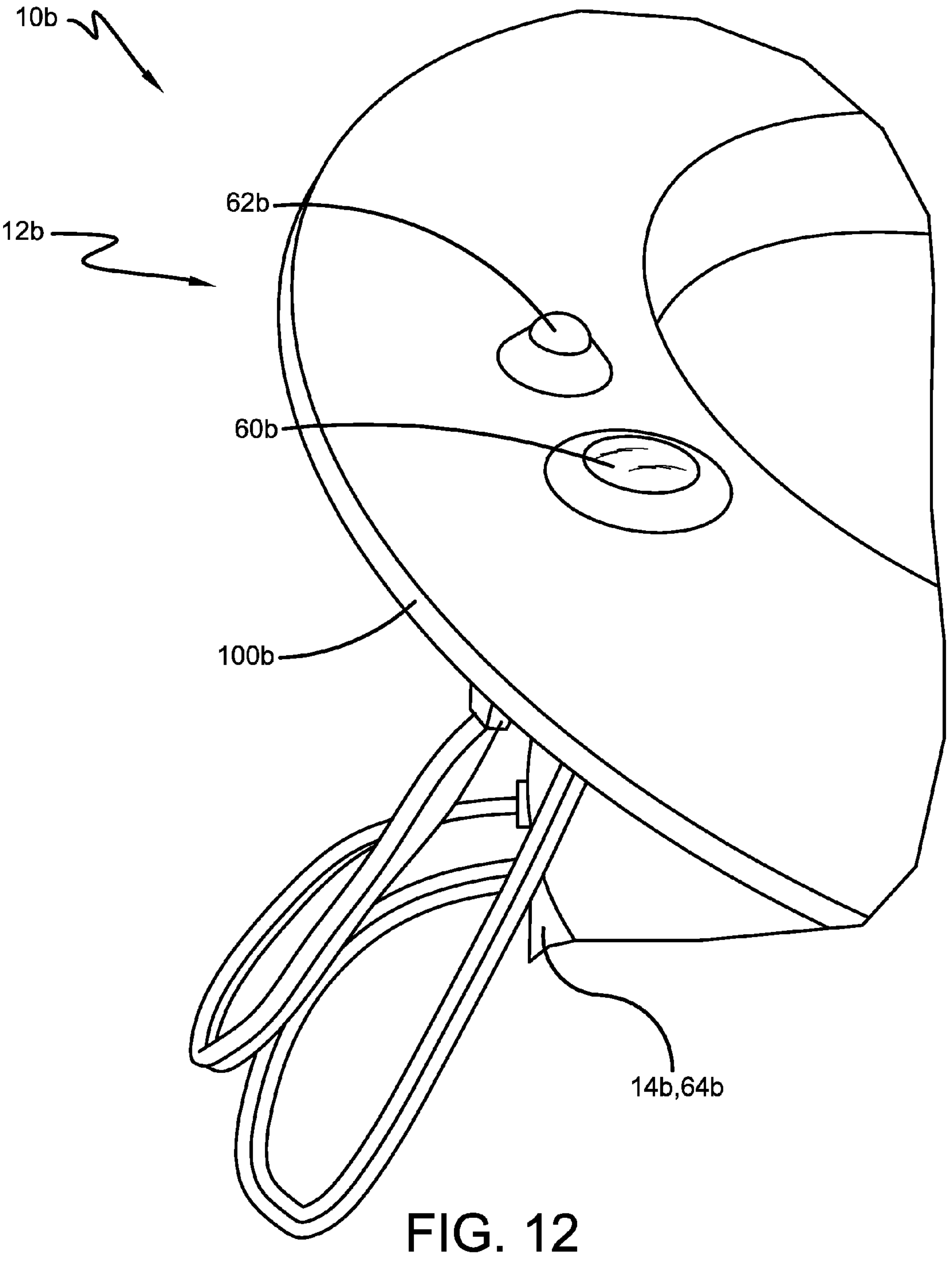
FIG. 12 is a side perspective view of the third exemplary lighting arrangement looking across a light emitter portion.

The third exemplary battery backup portion 14*b* is generally cubic and can be mounted directly to the light emitter 12*b*, similar to the first and second exemplary battery backup portions 14, 14*a*. The third exemplary battery backup portion 14*b* can include a case 64*b*. The exemplary case 64*b* extends from a bottom edge 96*b* to a top edge 98*b*. A converter portion 42*b* and a battery portion 44*b* can be positioned in the case 64*b*. The exemplary converter portion 42*b* is shown as a subcase 66*b*, as best shown in FIG. 11. The circuitry of the converter portion 42*b* is disposed within the subcase 66*b*. The schematic of FIG. 5 is applicable to the lighting arrangement 10*b*.

The exemplary battery portion 44*b* includes batteries 68*b*, 70*b*. The third exemplary battery backup portion 14*b* can also include a plug 74*b* for interconnecting electronically with the light emitter portion 12*b*, a plug 76*b* for interconnecting electronically with a test LED 62*b*, and a plug 78*b* for interconnecting electronically with a test button 60*b*. The light emitting diode 62*b* and the test button 60*b* are mounted in a flange portion 100*b* of the light emitter portion 12*b*. Apertures are defined in the exemplary case 64*b* for receiving mating plugs. It is noted that wiring among the various components is not shown to enhance the clarity of the other structures, but the batteries 68*b*, 70*b*, the converter portion 42*b*, and the plugs 74*b*, 76*b*, 78*b* are electronically connected with one another through wiring.

The third exemplary battery backup portion 14*b* can also include a door 82*b* to enclose the converter portion 42*b*, the plugs 74*b*, 76*b*, 78*b*, and the battery portion 44*b* in the case 64*b*. The door 82*b* can be selectively opened and closed with a clip 84*b*. When the door 82*b* is closed, the batteries 68*b*, 70*b* are enclosed in the case 64*b*. The lighting arrangement 10*b* can also include fins/springs 102*b*, 104*b*, 106*b* for mounting the lighting arrangement 10*b* in a hole in a ceiling.

FIGS. 13-16 are of an embodiment of the present disclosure that is a lighting arrangement 10*c* that can be mounted on a surface exposed in a dwelling space, such as a ceiling or a wall. The lighting arrangement 10*c* includes a light emitter portion 12*c* having a plurality of light emitting diodes 108*c* and circuitry (referenced generally at 110*c*) for driving the plurality of light emitting diodes 108*c* including a rectifier and an IC chip downstream of the rectifier. The lighting arrangement 10*c* also includes a battery backup portion 14*c* in electronic communication with the light emitter portion 12*c* and having a battery portion with one or more batteries and a converter portion with a DC-AC inverter downstream of the one or more batteries that directs the electrical signal to the rectifier and is driven by the one or batteries. The schematic of FIG. 5 is applicable to the lighting arrangement 10*c*.

Figure 16:
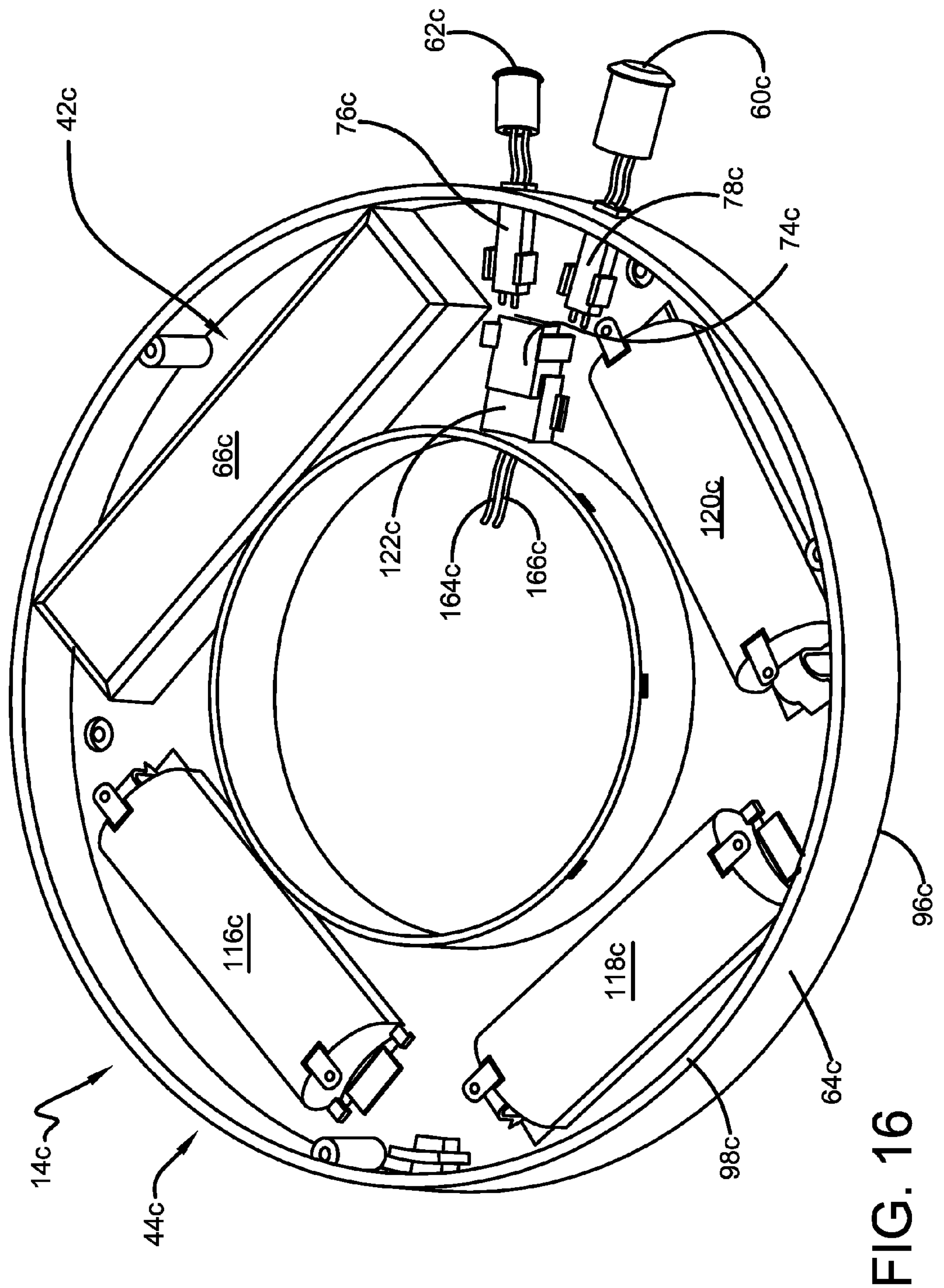
FIG. 16 is a perspective view from a top perspective looking downward of a battery backup portion of the fourth exemplary lighting arrangement with a top wall removed to show internal structures.
Figure 17:
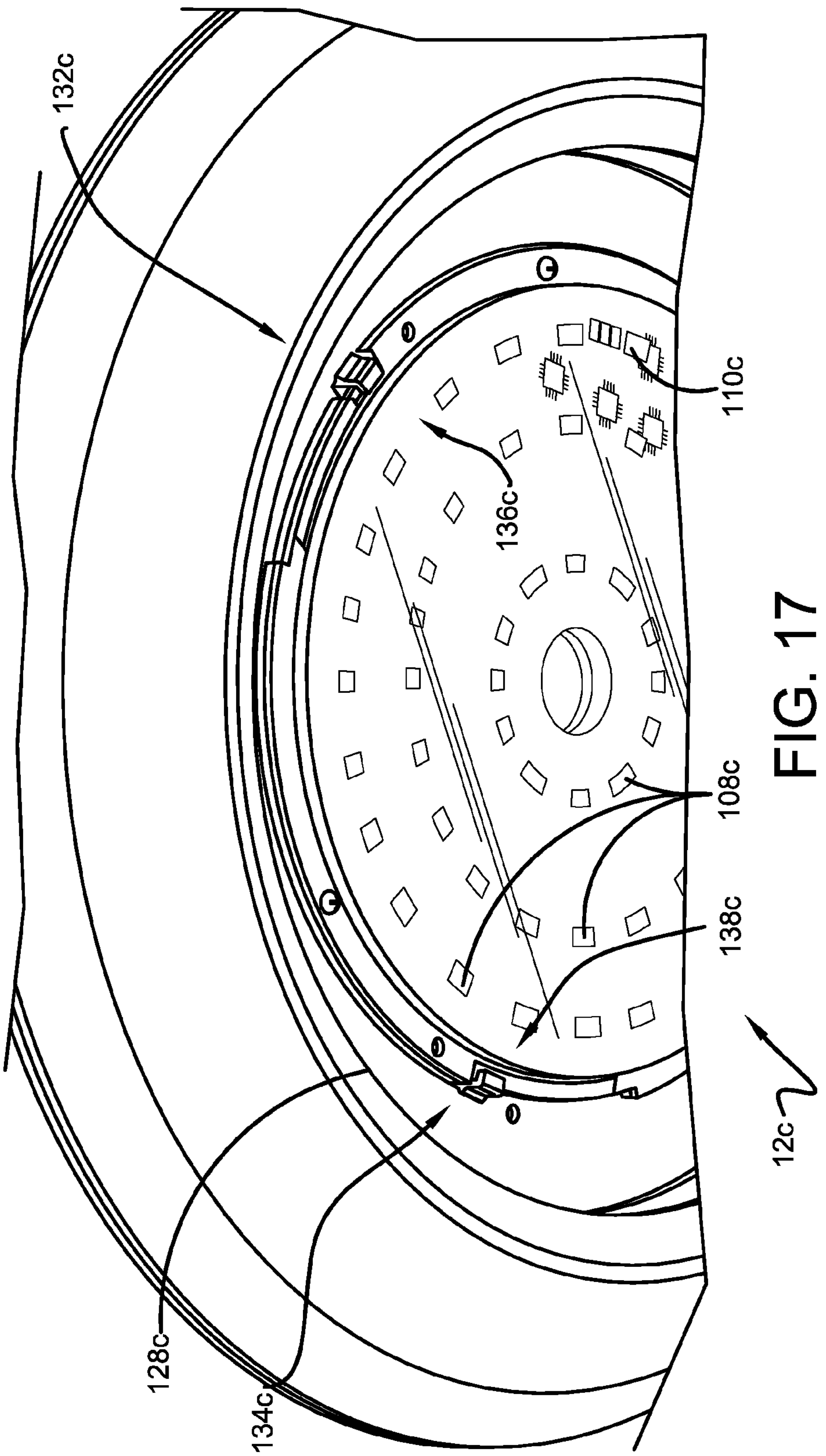
FIG. 17 is a magnified portion of FIG. 14.

The light emitter portion 12*c* and the battery backup portion 14*c* are centered on a longitudinal axis 112*c*. The third exemplary battery backup portion 14*c* is generally ring or donut-shaped. The third exemplary battery backup portion 14*c* can include a case 64*c*. The exemplary case 64*c* extends from a bottom edge 96*c* to a top edge 98*c* and can include a top wall 114*c*. A converter portion 42*c* and a battery portion 44*c* can be positioned in the case 64*c*. The exemplary converter portion 42*c* is shown as a subcase 66*c*, as best shown in FIG. 16. The circuitry of the converter portion 42*c* is disposed within the subcase 66*c*. The schematic of FIG. 5 is applicable to the lighting arrangement 10*c*.

The exemplary battery portion 44*c* includes batteries. In FIG. 16, the case 64*c* is shown having pockets 116*c*, 118*c*, 120*c* for receiving batteries. The perspective of FIG. 16 is from the top of the battery backup portion 14*c*, looking down. The openings of the pockets 116*c*, 118*c*, 120*c* for receiving the batteries is on the underside of the case 64*c* and therefore not visible in FIG. 16. The third exemplary battery backup portion 14*c* can also include a plug 74*c* for interconnecting electronically with the light emitter portion 12*c*. A plug from the light emitter 12*c* is referenced at 122*c*. The third exemplary battery backup portion 14*c* can also include a plug 76*c* for interconnecting electronically with a test LED 62*c*. The third exemplary battery backup portion 14*c* can also include a plug 78*c* for interconnecting electronically with a test button 60*c*. Apertures are defined in the exemplary case 64*c* for permitting passage of the plugs 76*c*, 78*c*. It is noted that wiring among the various components is not shown to enhance the clarity of the other structures, but the batteries, the converter portion 42*c*, and the plugs 74*c*, 76*c*, 78*c* are electronically connected with one another through wiring.

The fourth exemplary battery backup portion 14*c* can also include doors 82*c*, 124*c*, 126*c* to enclose the pockets 116*c*, 118*c*, 120*c* that receive the batteries. Each door 82*c*, 124*c*, 126*c* can be selectively opened and closed with a respective clip, such as clip 84*c* of door 82*c*. When the doors 82*c*, 124*c*, 126*c* are closed, the batteries are enclosed in the case 64*c*.

The lighting arrangement 10*c* further comprises a pan or shade 128*c* at least partially positioned between the light emitter portion 12*c* and the battery backup portion 14*c* along the longitudinal axis 112*c*. The electronic communication between the light emitter portion 12*c* and the battery backup portion 14*c* occurs through wires extending through an aperture 162*c* in the shade 128*c*, such as wires referenced at 164*c*, 166*c*. The shade 128*c* extends radially beyond the light emitter portion 12*c* relative to the longitudinal axis 112*c* and is configured to shield the battery backup portion 14*c* from light emitted by the light emitter portion 12*c*. The shade 128*c* can be mounted to a junction box or to the ceiling or wall, directly or with a bracket. The battery backup portion 14*c* can be mounted to the light emitter 12*c* through the shade 128*c*, as will be described in greater detail below. The light emitting diode 62*c* and the test button 60*c* can be mounted in a flange portion 130*c* of the shade 128*c*. The shade 128*c* includes apertures, such as apertures 158*c*, 160*c*, aligned with the doors 124*c*, 126*c* such that the doors 124*c*, 126*c* are exposed through the apertures 158*c*, 160*c*, allowing the batteries to be replaced without removing the shade 128*c* from the ceiling or wall. It is noted that the shade 128*c* can include an aperture aligned with door 82*c* as well.

Figure 18:
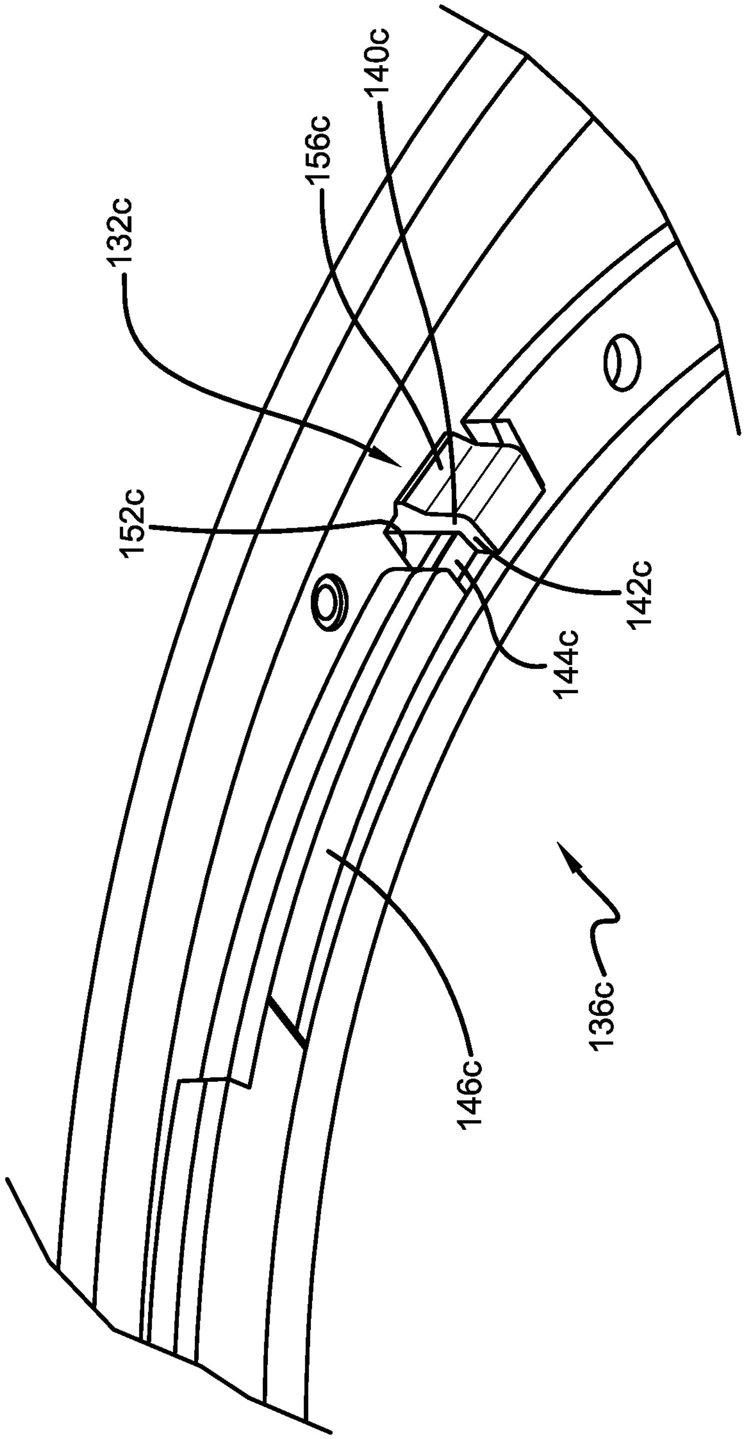
FIG. 18 is a magnified portion of FIG. 17.

The lighting arrangement 10 also includes a plurality of locking arms such as locking arms 132*c*, 134*c* and a plurality of circumferential notches such as circumferential notches 136*c*, 138*c*. The plurality of locking arms 132*c*, 134*c* can each be fixedly associated with the battery backup portion 14*c*. Each of the plurality of locking arms 132*c*, 134*c* can include an axial portion extending along the longitudinal axis 112*c* and a radial portion extending perpendicular to the longitudinal axis 112*c*. In FIG. 18, the exemplary locking arm 132*c* includes an axial portion 140*c* and a radial portion 142*c*. Each of the radial portions extends from a first end at an intersection with one of the axial portions to a respective second end distal relative to the first end.

Figure 13:
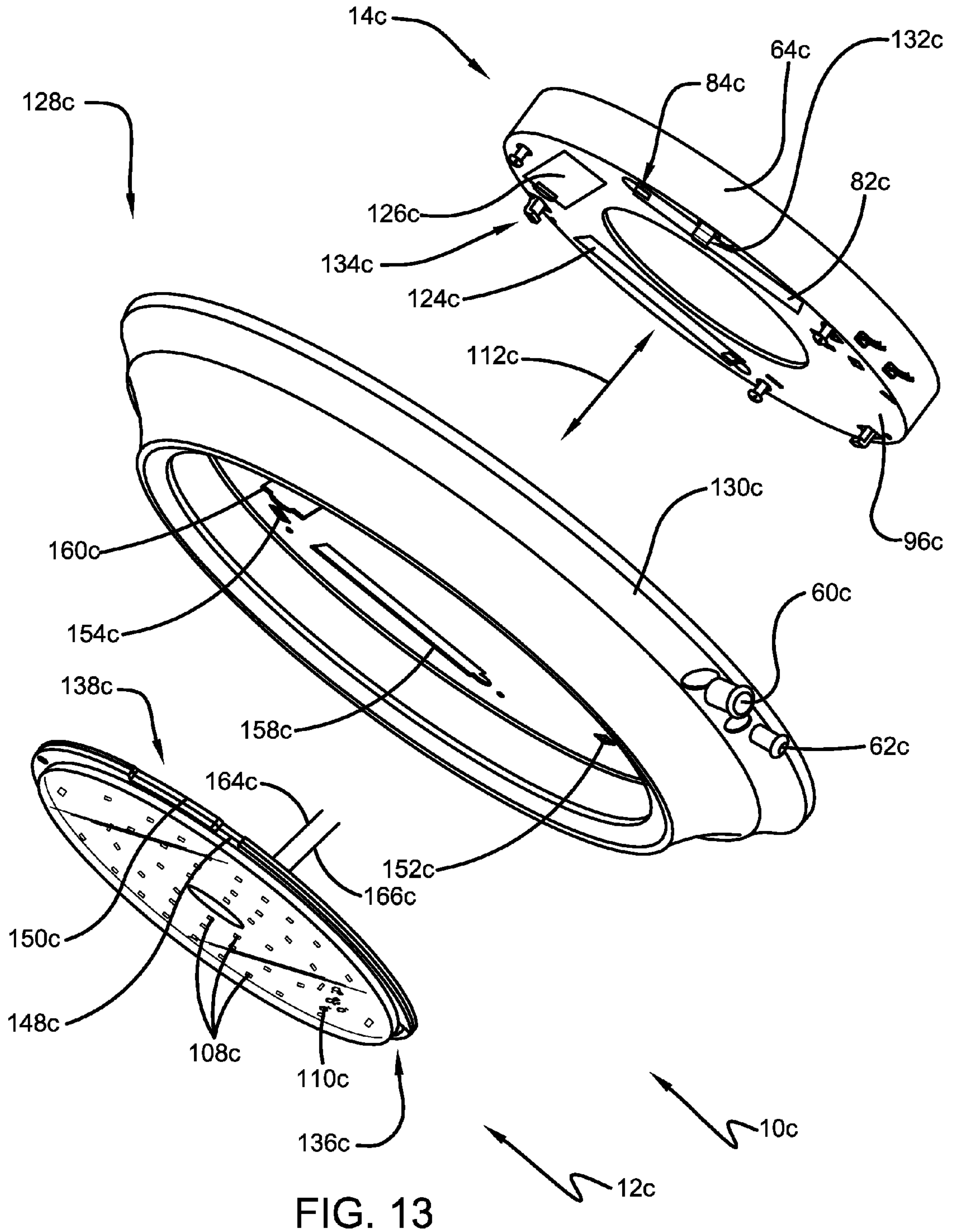
FIG. 13 is an exploded view of a fourth exemplary lighting arrangement according to one or more implementations of the present disclosure.
Figure 14:
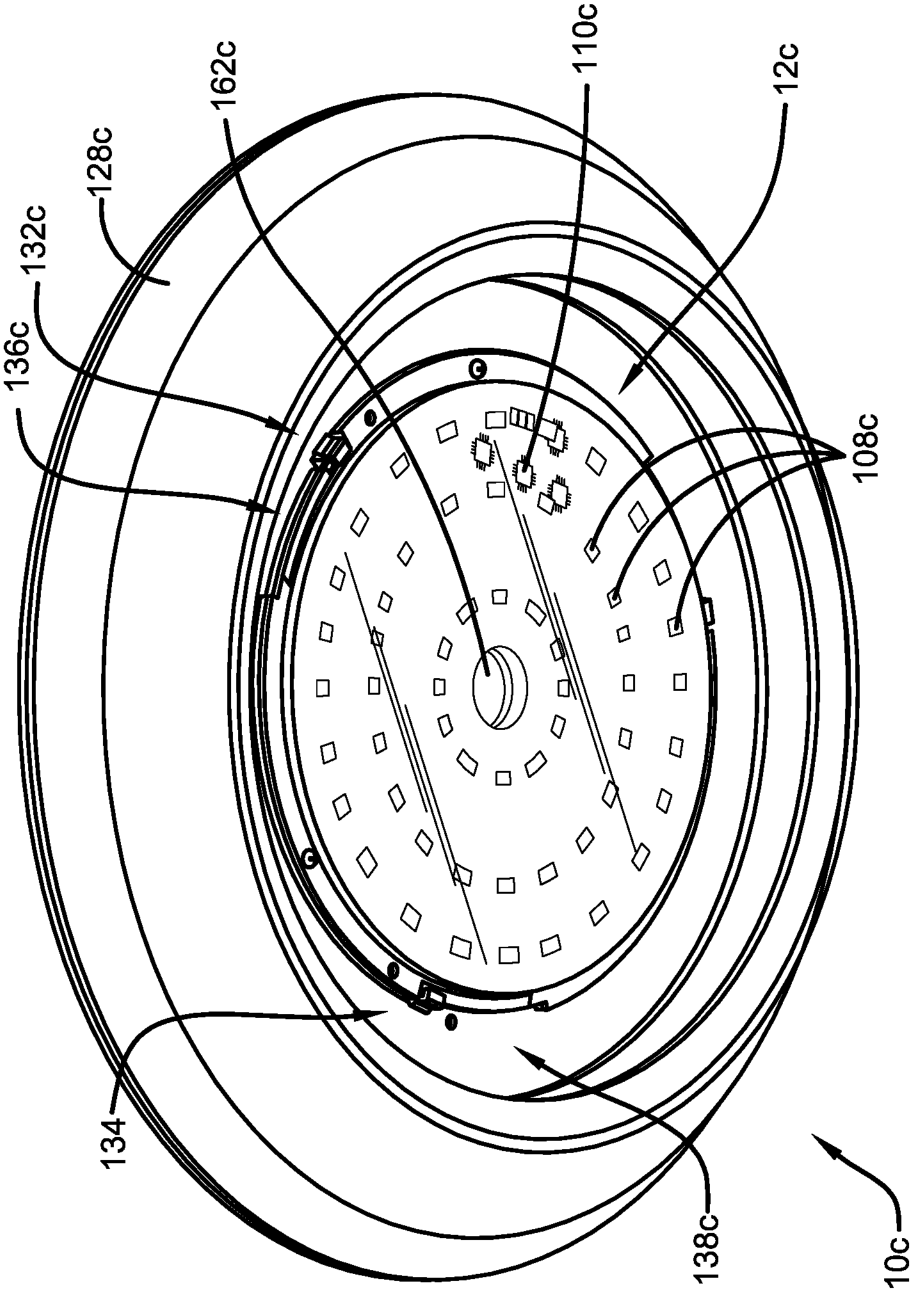
FIG. 14 is a perspective view from a bottom perspective looking upward of the fourth exemplary lighting arrangement.
Figure 15:
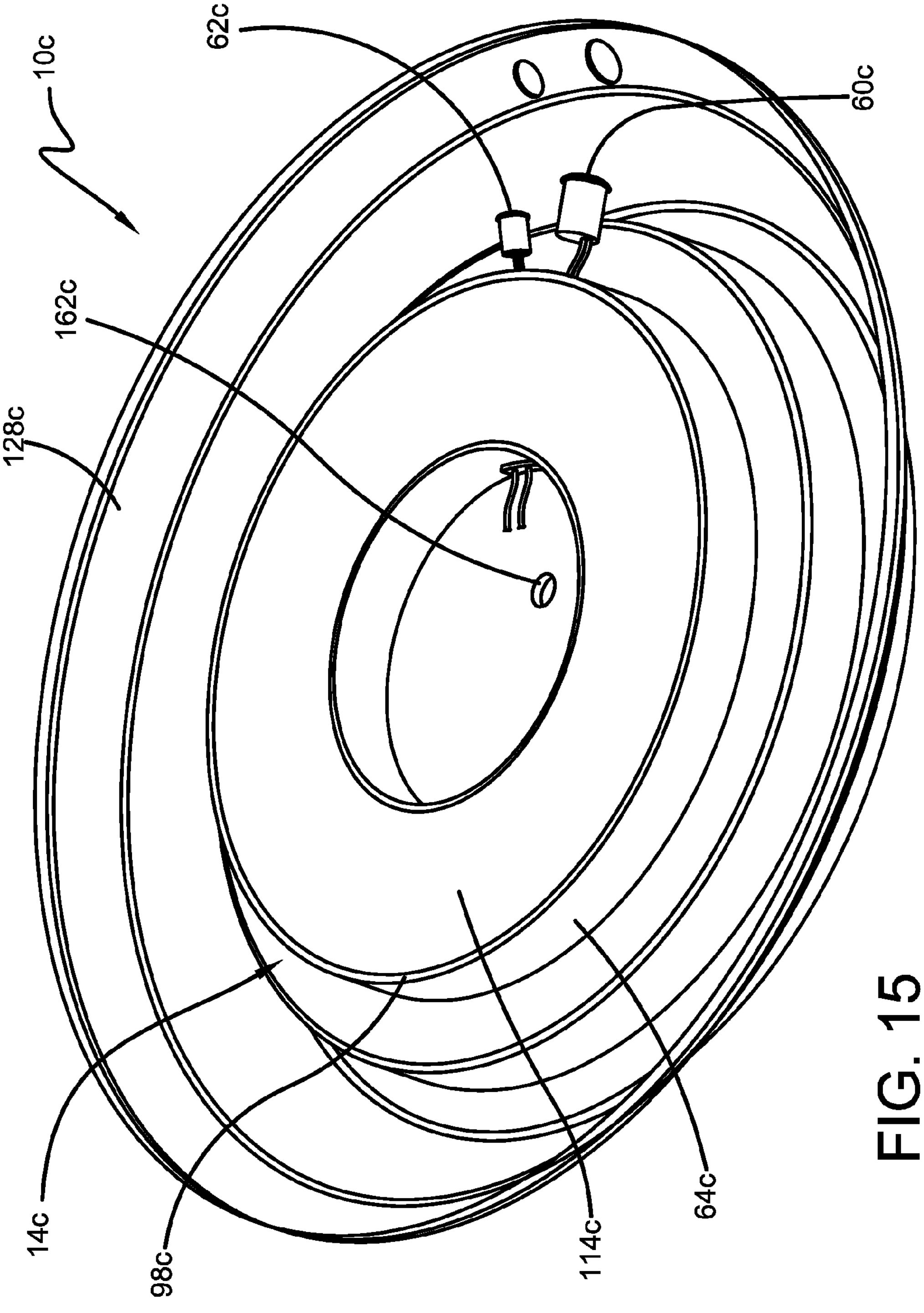
FIG. 15 is a perspective view from a top perspective looking downward of the fourth exemplary lighting arrangement.

Each of the plurality of exemplary circumferential notches 136*c*, 138*c* is defined in the light emitter portion 12*c*. Each of the plurality of circumferential notches 136*c*, 138*c* extends about the longitudinal axis 112*c* and defines a gap portion and a ledge portion. In FIG. 18, the exemplary circumferential notch 136*c* includes a gap portion 144*c* and a radial portion 146*c*. In FIG. 13, the exemplary circumferential notch 138*c* includes a gap portion 148*c* and a radial portion 150*c*.

The battery backup portion 14*c* and the shade 128*c* can be interconnected by passing the locking arms 132*c*, 134*c* through apertures in the shade 128*c*, such as apertures 152*c*, 154*c*. The apertures 152*c*, 154*c* can be sized to prevent movement of the plurality of locking arms 132*c*, 134*c* about the longitudinal axis 112*c*. 11. The plurality of locking arms 132*c*, 134*c* can engage at least some of the apertures 152*c*, 154*c* of the shade 128*c* through a snap-lock connection wherein the plurality of locking arms 132*c*, 134*c* elastically deform during passage through the apertures 152*c*, 154*c* of the shade 128*c* and recover after passage through the apertures 152*c*, 154*c* of the shade 128*c*. As best shown in FIG. 18, the locking arm 132*c* can include a radially-outer facing ramp 156*c* than rides along the aperture 152*c* and elastically deforms, and then snaps back to lock against the aperture 152*c*.

After the battery backup portion 14*c* has been engaged with the shade 128*c*, the light emitter portion 12*c* and the battery backup portion 14*c* can be interconnected by moving each of the plurality of radial portions through one of the plurality of gap portions along the longitudinal axis 112*c* and then rotating the light emitter portion 12*c* and the battery backup portion 14*c* relative to one another in a first angular direction about the longitudinal axis 112*c* and sliding each of the plurality of radial portions under the ledge portions. The ledge portions can rest on the radial portions.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein as other present disclosures in other patent documents is hereby unconditionally reserved.

What is claimed is:

1. A lighting arrangement comprising:

a light emitter portion having a plurality of light emitting diodes in an array string and circuitry for driving said plurality of light emitting diodes including a rectifier and an IC chip configured to drive said plurality of light emitting diodes with the rectified voltage provided by said rectifier; and a battery backup portion in electronic communication with said light emitter portion and having:

a battery portion with one or more batteries, a converter portion with a DC-AC inverter positioned between the one or more batteries and the light emitter portion, said converter portion connected to said rectifier and configured to receive power from the one or more batteries, and said converter portion including a microcontroller unit, said microcontroller unit configured to route AC power to the rectifier from either a primary AC source or the battery portion; and wherein the light emitter portion is configured to control individual light emitting diodes of said array string such that the quantity of illuminated light emitting diodes is variable and based on a voltage level of said battery portion.

2. The lighting arrangement of claim 1 wherein each of said one or more batteries is further defined as having a volume substantially equal to one-thousand two-hundred and eighty-four cubic millimeters.

3. The lighting arrangement of claim 1 wherein said one or more batteries is three batteries having a combined volume substantially equal to fifty-one-thousand eight-hundred and fifty-one cubic millimeters.

4. The lighting arrangement of claim 1 wherein each of said one or more batteries is further defined as rated at 3.8 volts, 2600 mAH and have a capacity is 9.88 WH after being charged.

5. The lighting arrangement of claim 1 wherein each of said one or more batteries has a capacity substantially equal to 9.88 Wh after being charged.

6. The lighting arrangement of claim 1 wherein said one or more batteries is further defined as a plurality of batteries having a combined capacity substantially equal to 29.64 Wh after being charged.

7. The lighting arrangement of claim 1 wherein said converter portion further comprises a microcontroller unit configured to monitor power levels directed to said light emitter portion.

8. The lighting arrangement of claim 7 wherein said converter portion further comprises a sinusoidal pulse-width modulation module, said sinusoidal pulse-width modulation module configured to generate a sinusoidal modulated pulse in response to a control signal emitted by said microcontroller unit to said sinusoidal pulse-width modulation module.

9. The lighting arrangement of claim 1 wherein said light emitter portion and said battery backup portion are further defined as fixed directly together.

10. The lighting arrangement of claim 9 wherein said light emitter portion and said battery backup portion are further defined as having substantially the same outer profile.

11. A lighting arrangement comprising:

a light emitter portion having a plurality of light emitting diodes and circuitry for driving said plurality of light emitting diodes including a rectifier and an IC chip configured to drive said plurality of light emitting diodes with the rectified voltage provided by said rectifier;

a battery backup portion in electronic communication with said light emitter portion and having:

a battery portion with one or more batteries, and a converter portion with a DC-AC inverter positioned between the one or more batteries and the light emitter portion, said converter portion connected to said rectifier and configured to receive power from the one or more batteries, and said converter portion including a microcontroller unit, said microcontroller unit configured to route AC power to the rectifier from either a primary AC source or the battery portion; and wherein said light emitter portion and said battery backup portion are centered on a longitudinal axis and wherein said lighting arrangement further comprises:

a shade at least partially positioned between said light emitter portion and said battery backup portion along said longitudinal axis, said shade extending radially beyond said light emitter portion relative to said longitudinal axis and configured to shield said battery backup portion from light emitted by said light emitter portion.

12. The lighting arrangement of claim 11 further comprising:

a plurality of locking arms each fixedly associated with one of said light emitter portion and said battery backup portion, each of said plurality of locking arms including an axial portion extending along said longitudinal axis and a radial portion extending perpendicular to said longitudinal axis, each of said radial portions extending from a first end at an intersection with one of said axial portions to a respective second end distal relative to said first end;

a plurality of circumferential notches each defined in the other of said light emitter portion and said battery backup portion, each of said plurality of circumferential notches extending about said longitudinal axis and defining a gap portion and a ledge portion; and wherein said light emitter portion and said battery backup portion are interconnected by moving each of said plurality of radial portions through one of said plurality of gap portions along said longitudinal axis and then rotating said light emitter portion and said battery backup portion relative to one another in a first angular direction about said longitudinal axis and sliding each of said plurality of radial portions under said ledge portions.

13. The lighting arrangement of claim 12 wherein each of said plurality of locking arms extend through apertures in said shade.

14. The lighting arrangement of claim 13 wherein at least some of said plurality of locking arms engage at least some of said apertures of said shade through a snap-lock connection wherein said at least some of said plurality of locking arms elastically deform during passage through said at least some of said apertures of said shade and recover after passage through said at least some of said apertures of said shade.

15. The lighting arrangement of claim 13 wherein said apertures prevent movement of said plurality of locking arms about said longitudinal axis.

16. The lighting arrangement of claim 11 wherein:

said battery backup further comprises at least one openable door enclosing one of said one or more batteries; and said shade further comprises at least one aperture wherein said at least one openable door is exposed through said at least one aperture.

17. The lighting arrangement of claim 16 wherein said at least one openable door is further defined as a plurality of doors and said at least one aperture is further defined as a plurality of apertures.

18. The lighting arrangement of claim 11 wherein the electronic communication between said light emitter portion and said battery backup portion is further defined as occurring through one or more wires extending through an aperture in said shade.

19. The lighting arrangement of claim 11 wherein the electronic communication between said light emitter portion and said battery backup portion is further defined as occurring through mating plugs.

20. The lighting arrangement of claim 11 further comprising:

a light emitting diode; and a test button in electronic communication with said battery backup and configured such that pressing of the test button places said light emitting diode in electronic communication with said one or more batteries of said battery backup, wherein said light emitting diode and said test button are mounted in said shade.

21. A lighting arrangement comprising:

a light emitter portion having a plurality of light emitting diodes and circuitry for driving said plurality of light emitting diodes including a rectifier and an IC chip configured to drive said plurality of light emitting diodes with the rectified voltage provided by said rectifier;

a battery backup portion in electronic communication with said light emitter portion and having:

a battery portion with one or more batteries, and a converter portion with a DC-AC inverter positioned between the one or more batteries and the light emitter portion, said converter portion connected to said rectifier and configured to receive power from the one or more batteries, and said converter portion including a microcontroller unit, said microcontroller unit configured to route AC power to the rectifier from either a primary AC source or the battery portion;

a light emitting diode; and a test button in electronic communication with said battery backup and configured such that pressing of the test button places said light emitting diode in electronic communication with said one or more batteries of said battery backup, wherein said light emitting diode and said test button are mounted in said battery backup portion.

22. The lighting arrangement of claim 1 further comprising:

a light emitting diode; and a test button in electronic communication with said battery backup and configured such that pressing of the test button places said light emitting diode in electronic communication with said one or more batteries of said battery backup, wherein said light emitting diode and said test button are mounted in said light emitter portion.

23. The lighting arrangement of claim 1 wherein:

said one or more batteries is further defined as a plurality of batteries; and wherein said battery backup further comprises an openable door selectively enclosing said plurality of batteries.

* * * * *